(12) United States Patent  
Masuda

(10) Patent No.: US 7,374,353 B2  
(45) Date of Patent: May 20, 2008

(54) LIGHT CONTROL APPARATUS AND OPTICAL APPARATUS

(75) Inventor: Shinichi Masuda, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 11/245,692

(22) Filed: Oct. 7, 2005

(65) Prior Publication Data

US 2006/0078331 A1    Apr. 13, 2006

(30) Foreign Application Priority Data

Oct. 8, 2004    (JP)    ............................. 2004-296908

(51) Int. Cl.
*G03B 9/00*    (2006.01)
*G03B 9/08*    (2006.01)

(52) U.S. Cl. ...................... 396/460; 396/469
(58) Field of Classification Search ......... 396/458–470
See application file for complete search history.

(56) References Cited

U.S. PATENT DOCUMENTS

| 3,673,942 | A | * | 7/1972 | Tingley | ....................... 396/463 |
| 4,798,375 | A | * | 1/1989 | Yamamoto | ..................... 271/82 |
| 5,970,268 | A | * | 10/1999 | Aoshima | ..................... 396/469 |
| 6,089,760 | A | * | 7/2000 | Terada | ......................... 396/463 |
| 2003/0156832 | A1 | * | 8/2003 | Nomura et al. | ............... 396/72 |
| 2006/0002702 | A1 | * | 1/2006 | Masuda et al. | .............. 396/510 |

FOREIGN PATENT DOCUMENTS

JP    2002-350924    12/2002

* cited by examiner

*Primary Examiner*—W. B. Perkey
*Assistant Examiner*—Andrew Williams
(74) *Attorney, Agent, or Firm*—Cowan, Liebowitz & Latman, P.C.

(57) ABSTRACT

There is provided a light control apparatus that maintains the overall apparatus size small, increases the number of stop stages, and is suitable for both the shutter and stop actions. A light control apparatus includes a first actuator, a second actuator, a first light shielding member driven by the first actuator, and a second light shielding member driven by the second actuator, wherein in a stop adjusting action, the first and second actuators drive the first and second light shielding members and adjust an aperture formed by the first and second light shielding members, and wherein in a shutter action, the second actuator drives the second light-shielding member for a light shielding action.

10 Claims, 16 Drawing Sheets

LIGHT CONTROL APPARATUS AND OPTICAL APPARATUS

BACKGROUND OF THE INVENTION

The present invention relates to a light control apparatus for a stop-cum-shutter to be mounted in an optical apparatus, such as a still camera, a video camera and an interchangeable lens.

As an optical apparatus, such as a digital camera, has been made smaller, a smaller shutter unit and a smaller stop unit are required to be mounted on it. A light control apparatus (shutter-cum-stop unit) is known which serves as both a shutter and a stop, and makes the optical apparatus smaller than a combination of a shutter unit and a stop unit separately.

Japanese Patent Application, Publication No. 2002-55375 discloses a stop-cum-shutter unit that includes a pair of motors, and a pair of stop-cum-shutter blades driven by these motors. As one motor is electrified, the stop-cum-shutter unit drives both stop-cum-shutter blades to a position that forms a predetermined aperture. As the other motor is electrified while the stop state is maintained, both stop-cum-shutter blades acts as a shutter. The disclosed stop-cum-shutter unit switches actions of these two motors, and sets the apertures to two predetermined apertures and release aperture. In other words, the unit acts as a shutter as well as selecting plural apertures.

However, the above conventional stop-cum-shutter unit in which one motor drives two stop-cum-shutter blades and forms an aperture has difficulties in making the aperture shape circular and making the stop multistage. In other words, the above conventional stop-cum-shutter unit provides only three apertures, a release aperture, an aperture driven by one motor, and another aperture driven by the other motor.

One known method for increasing the number of stop stages and make circular the stop shape is that a stepping motor drives plural stop blades using another component, such as a ring member. However, use of the ring member increases the number of components, and makes the apparatus large. In addition, the stepping motor is unsuitable for quick shutter actions of plural stop blades connected to the ring member. The high-speed shutter action needs a dedicated shutter blade and a motor.

Moreover, the above conventional stop-cum-shutter unit uses the same type of actuators that enable each of the two motors to drive the stop and the shutter. It is therefore difficult to form a suitable structure for both the stop action and the shutter action.

BRIEF SUMMARY OF THE INVENTION

The present invention is directed to a light control apparatus that maintains the overall apparatus size small, increases the number of stop stages, and is suitable for both the shutter and stop actions.

A light control apparatus according to one aspect of the present invention includes a first actuator, a second actuator, a first light shielding member driven by the first actuator, and a second light shielding member driven by the second actuator, wherein in a stop adjusting action, the first and second actuators drive the first and second light shielding members and adjust an aperture formed by the first and second light shielding members, and wherein in a shutter action, the second actuator drives the second light-shielding member for a light shielding action.

A light control apparatus according to another aspect of the present invention includes a first actuator, a second actuator, a first light shielding member driven by the first actuator, and a second light shielding member driven by the second actuator, and driven by the first light shielding member driven by the first actuator, wherein in a stop adjusting action, the first actuator drives the first and second light shielding members and adjusts an aperture formed by the first and second light shielding members, and wherein in a shutter action, the second actuator drives the second light-shielding member for a light shielding action.

An optical apparatus according to another aspect of the present invention includes the above light control apparatus and an image-pickup device for photoelectrically converting a subject image that passes an aperture formed by said first and second light shielding members.

DETAILED DESCRIPTION OF THE PREFERRED EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Exemplary embodiments will be described in detail below with reference to the drawings.

First Embodiment

Figure 1:
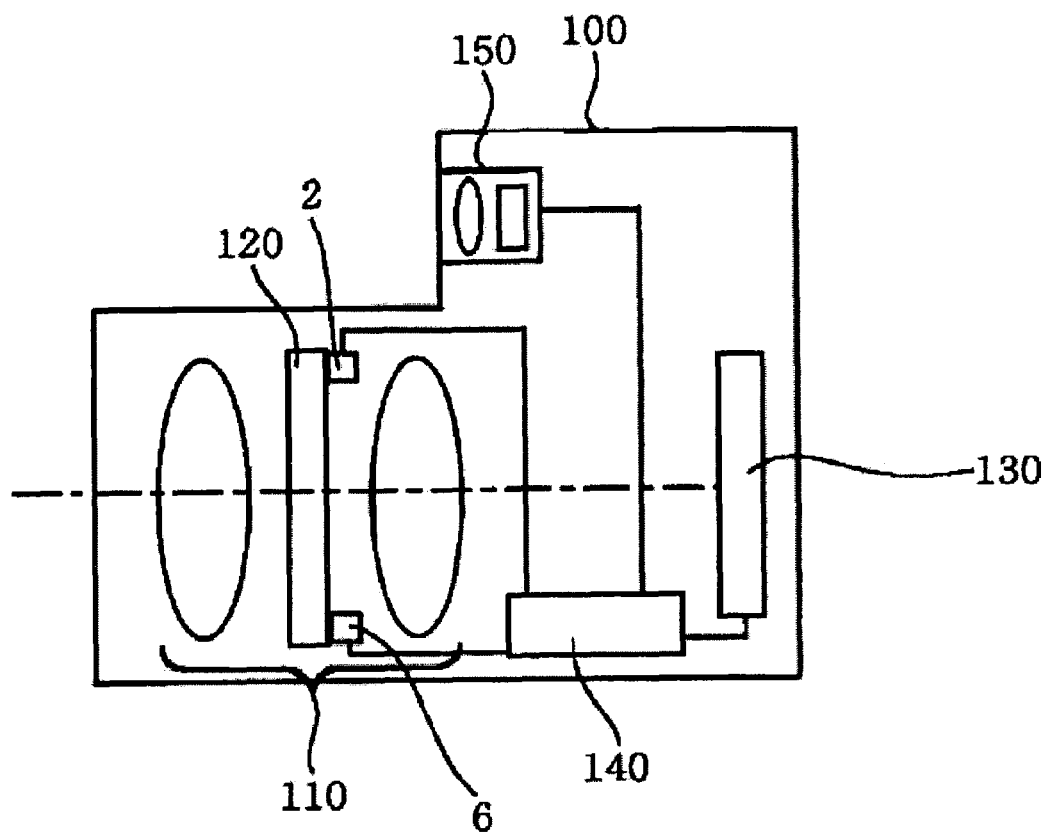
FIG. 1 shows a schematic structure of a digital still camera according to a first embodiment of the present invention.

FIG. 1 shows a schematic structure of a digital still camera having a light control apparatus according to a first embodiment of the present invention. In FIG. 1, 100 denotes a camera body, and 110 denotes an image-taking optical system. The light control apparatus 120 is provided in the image-taking optical system 110. 130 denotes an image-pickup device or an image sensor, such as a CCD sensor and a CMOS sensor, and photoelectrically converts a subject image formed by the image-taking optical system 110. An image processing control circuit 140 performs various processes for an output signal from the image-pickup device 130, and generates a shot image. The data of the shot image is recorded in a recording medium (not shown), such as a semiconductor memory, a magnetic disc, and an optical disc.

Figure 2:
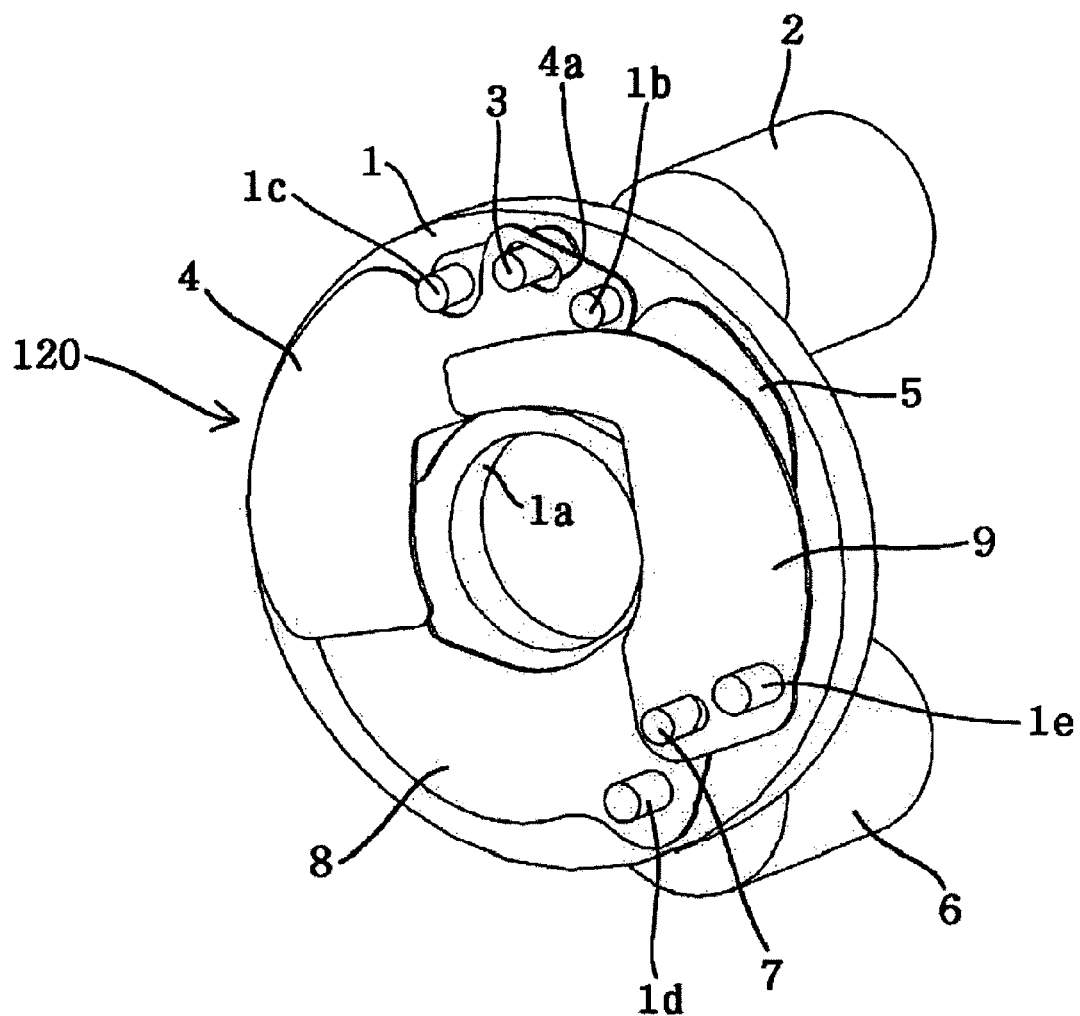
FIG. 2 is a schematic perspective view of a light control apparatus according to the first embodiment.
Figure 3:
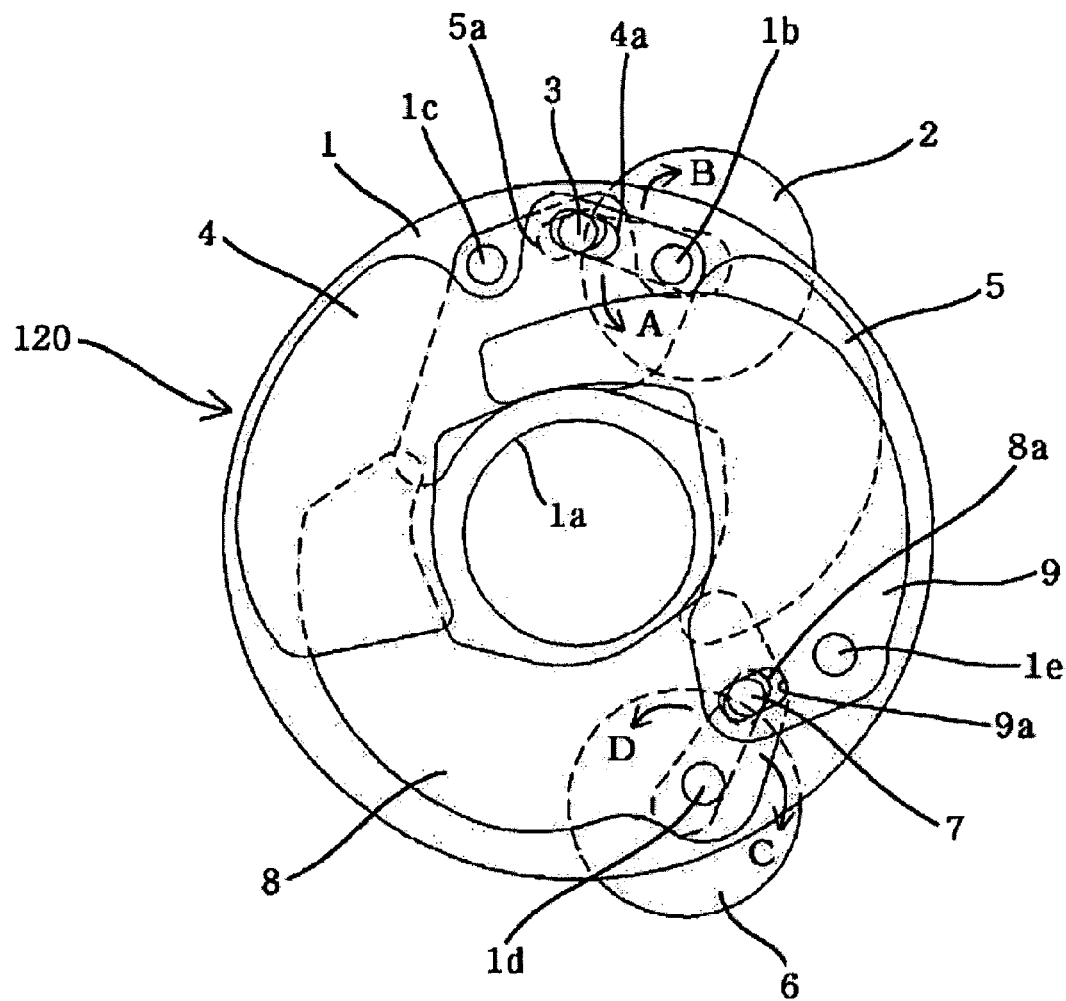
FIG. 3 is a front view of the light control apparatus in a release state according to the first embodiment.
Figure 4:
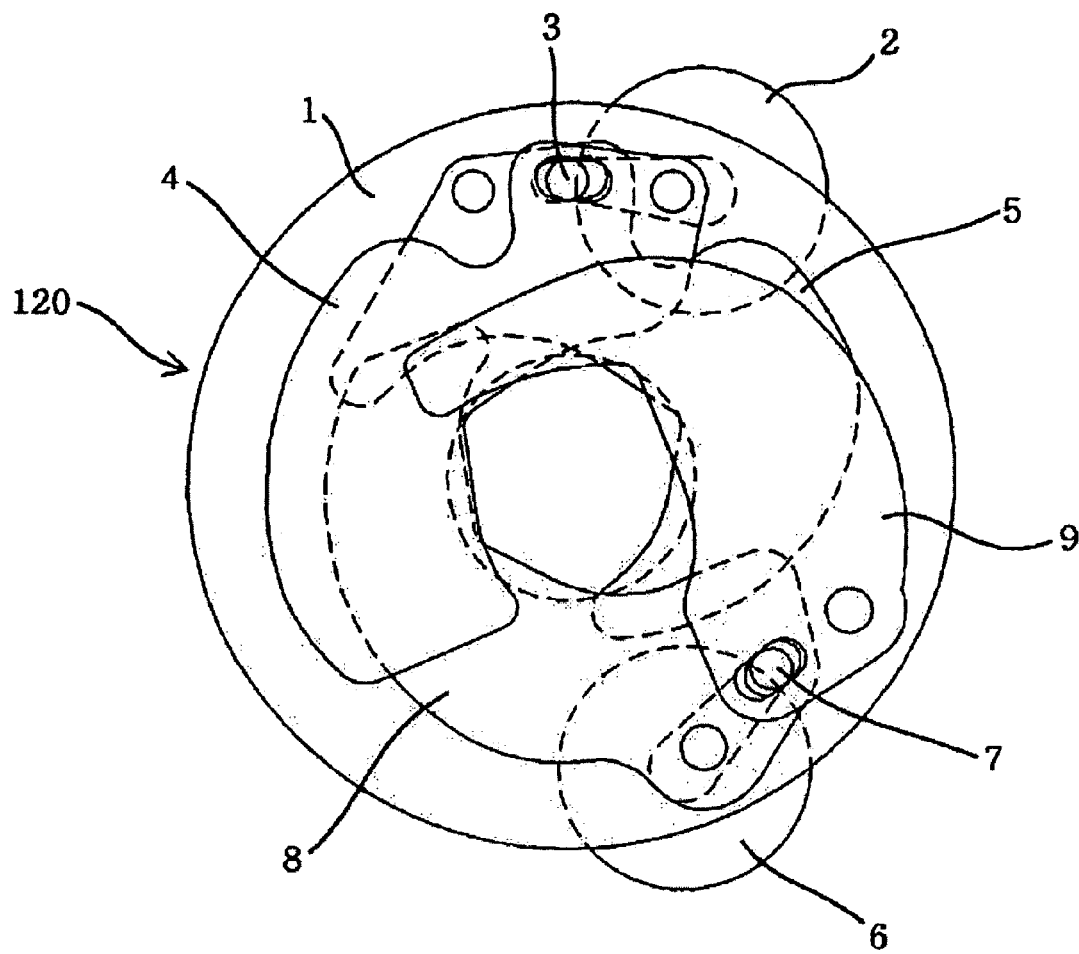
FIG. 4 is a front view of the light control apparatus in an intermediate stop state according to the first embodiment.
Figure 5:
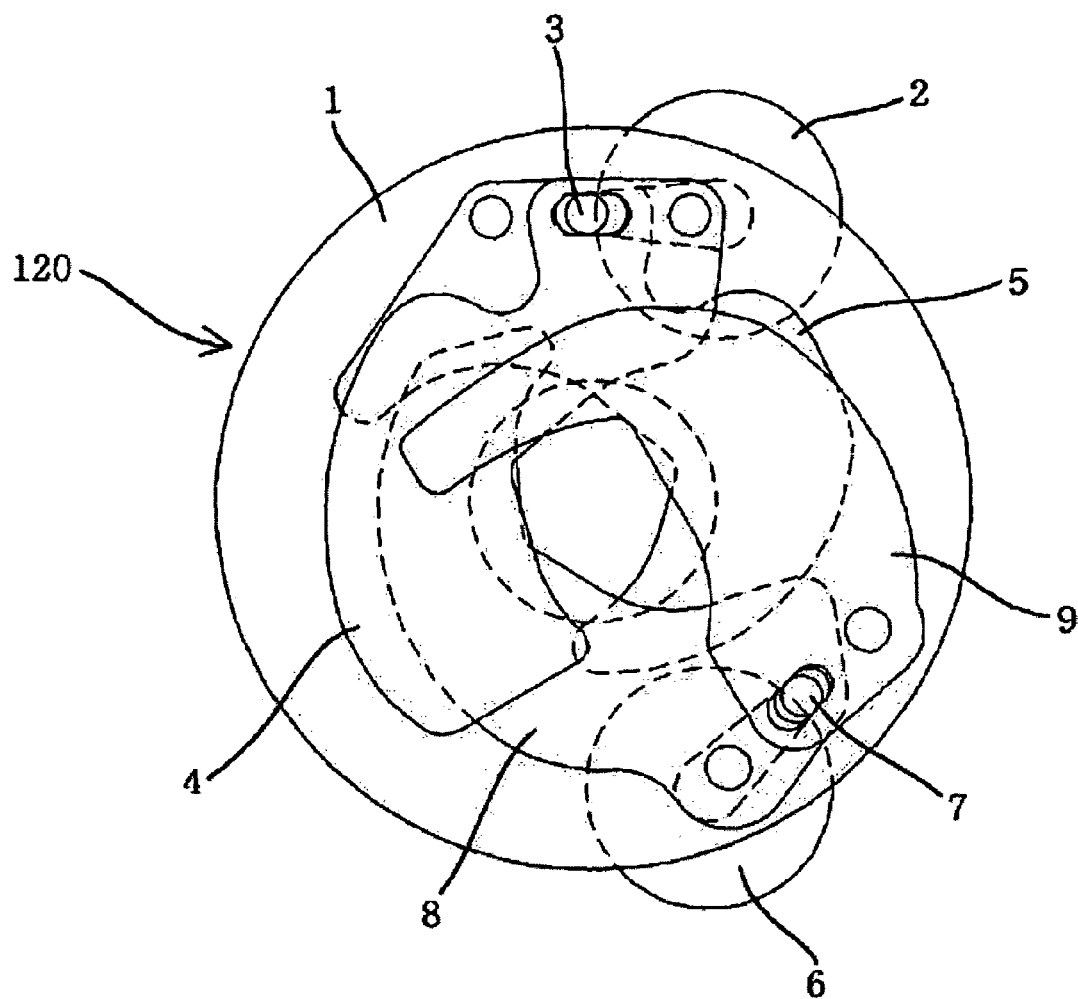
FIG. 5 is a front view of the light control apparatus in an intermediate stop state according to the first embodiment.
Figure 6:
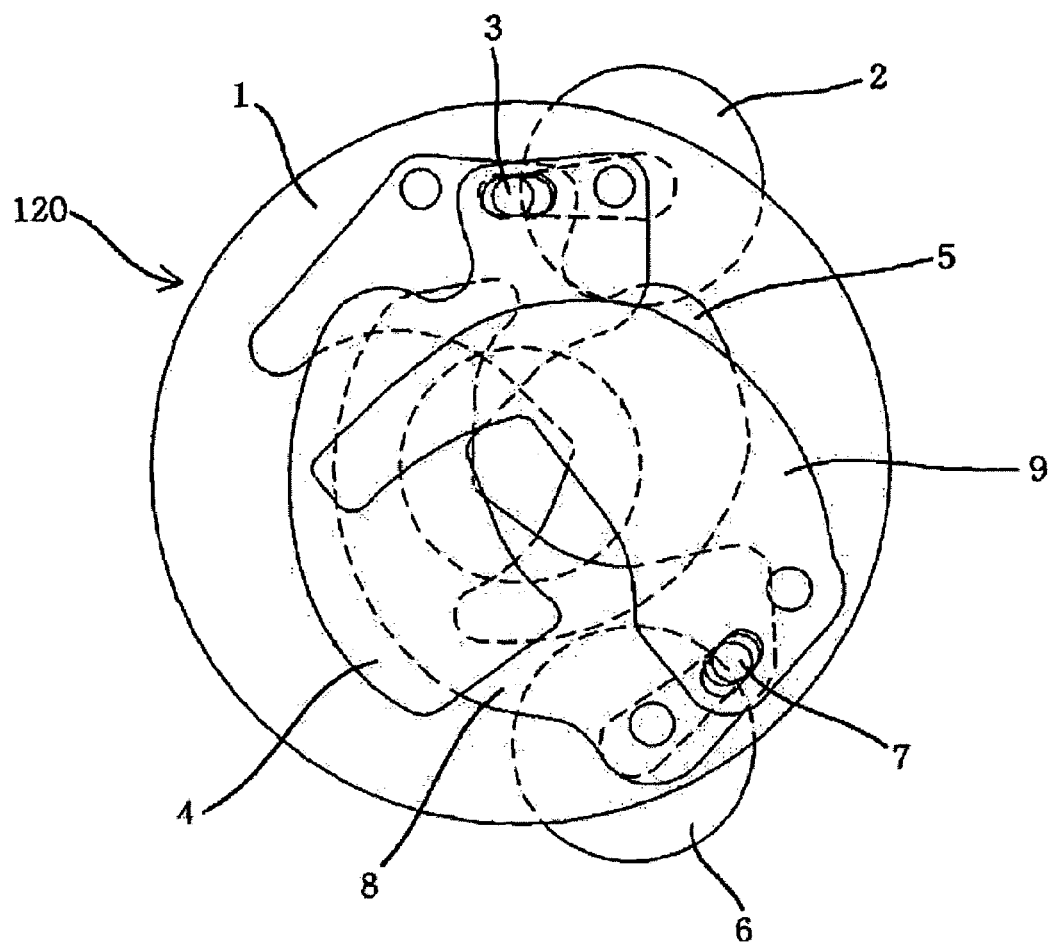
FIG. 6 is a front view of the light control apparatus in an intermediate stop state according to the first embodiment.
Figure 7:
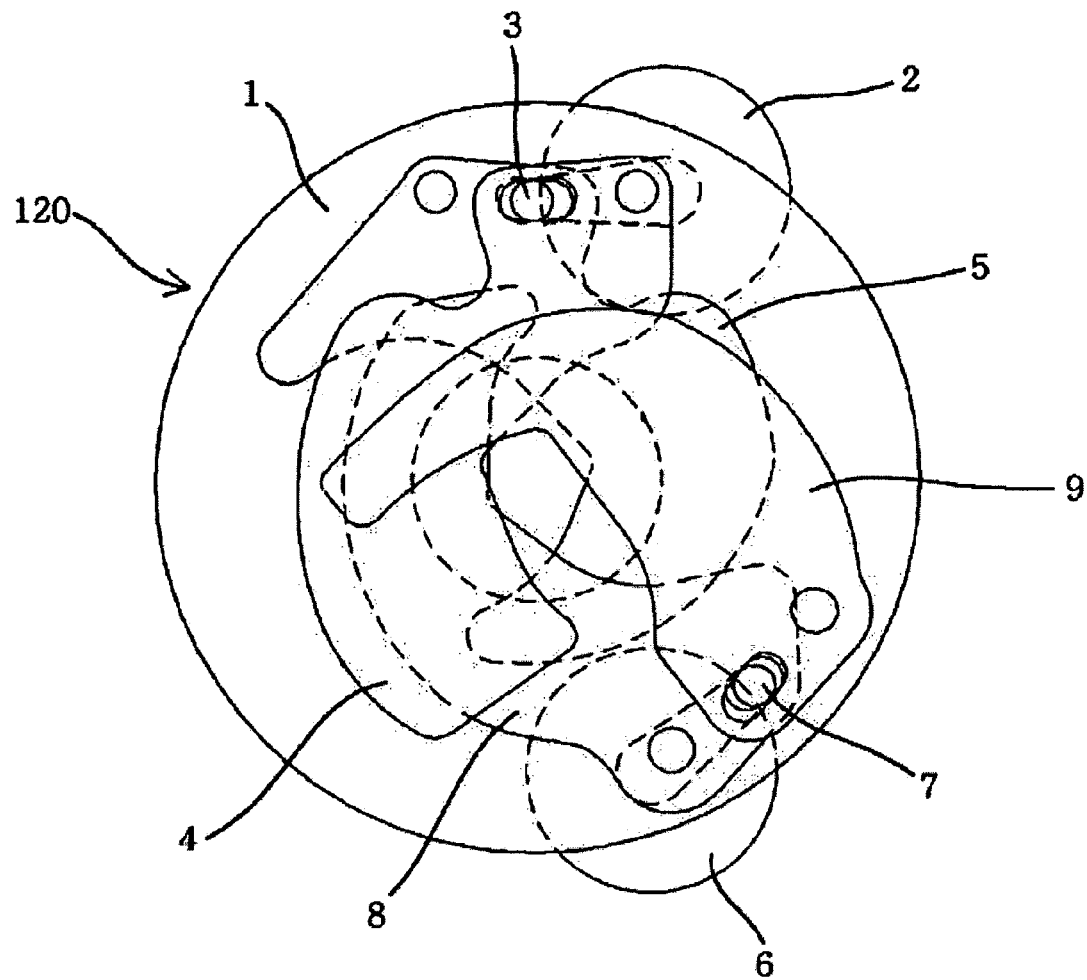
FIG. 7 is a front view of the light control apparatus in an intermediate stop state according to the first embodiment.

FIGS. 2 and 3 show a light control apparatus 120 as a stop-cum-shutter apparatus according to this embodiment.

1 denotes a base plate having a release opening 1a at its center thereof. A stepping motor (or first actuator) 2 is held above the base plate 1 and changes a stop position in accordance with a current value. A rotation of the stepping motor 2 is transmitted to blades (or first light shielding members) 4 and 5 via a driving lever 3. As the stepping motor 2 rotates in an A direction in FIG. 3, the blades 4 and 5 rotate around shaft parts 1b and 1c provided on the base plate 1, and close an opening formed by the blades 4 and 5. As the stepping motor 2 rotates in a B direction in FIG. 3, the blades 4 and 5 rotate around the shaft parts 1b and 1c and open the opening formed by the blades 4 and 5.

A bipolar moving magnet type electromagnetic motor (second actuator) 6 is held under the base plate 1. A rotation of the electronic motor 6 is transmitted to the driving lever 7 to the blades (second light shielding members) 8 and 9. As the electromagnetic motor 6 rotates in a C direction in FIG. 3, the blades 8 and 9 rotate around the shaft parts 1d and 1e provided on the base plate 1, and close the opening formed by the blades 8 and 9. When the electromagnetic motor 6 rotates in a D direction in FIG. 3, the blades 8 and 9 rotate around the shaft parts 1d and 1e, and open the opening formed by the blades 8 and 9.

A description will be given of an arrangement among the blades 4, 5, 8 and 9. The blade 5 is arranged closest to the base plate 1, and the blades 8, 4 and 9 arranged on the blade 5 in this order. The tips of the blades 5 and 8 and peripheral parts of the shaft parts 1c and 1d as rotational centers always overlap each other.

The above overlapping order of the four blades 4, 5, 8 and 9 maintains irrespective of their rotational states, and no interference occurs which would otherwise preclude the operations among the blades. In addition, overlapping of these blades can make the light control apparatus 120 small in a plane orthogonal to the optical axis.

A cover plate (not shown) is attached to the base plate 1 and covers the blades 4, 5, 8 and 9 so as to rotatably house these blades 4, 5, 8 and 9 in a space along a predetermined optical-axis direction.

FIG. 3 shows that all of the blades 4, 5, 8 and 9 rotate to the fully open positions, and the aperture at this state is a release aperture corresponding to the release opening 1a. In this state, both the stepping motor 2 and the electromagnetic motor 6 are not electrified.

A description will be given of the stop adjusting action and shutter action of the thus configured light control apparatus 120, with reference to a flowchart shown in FIG. 16.

Figure 16:
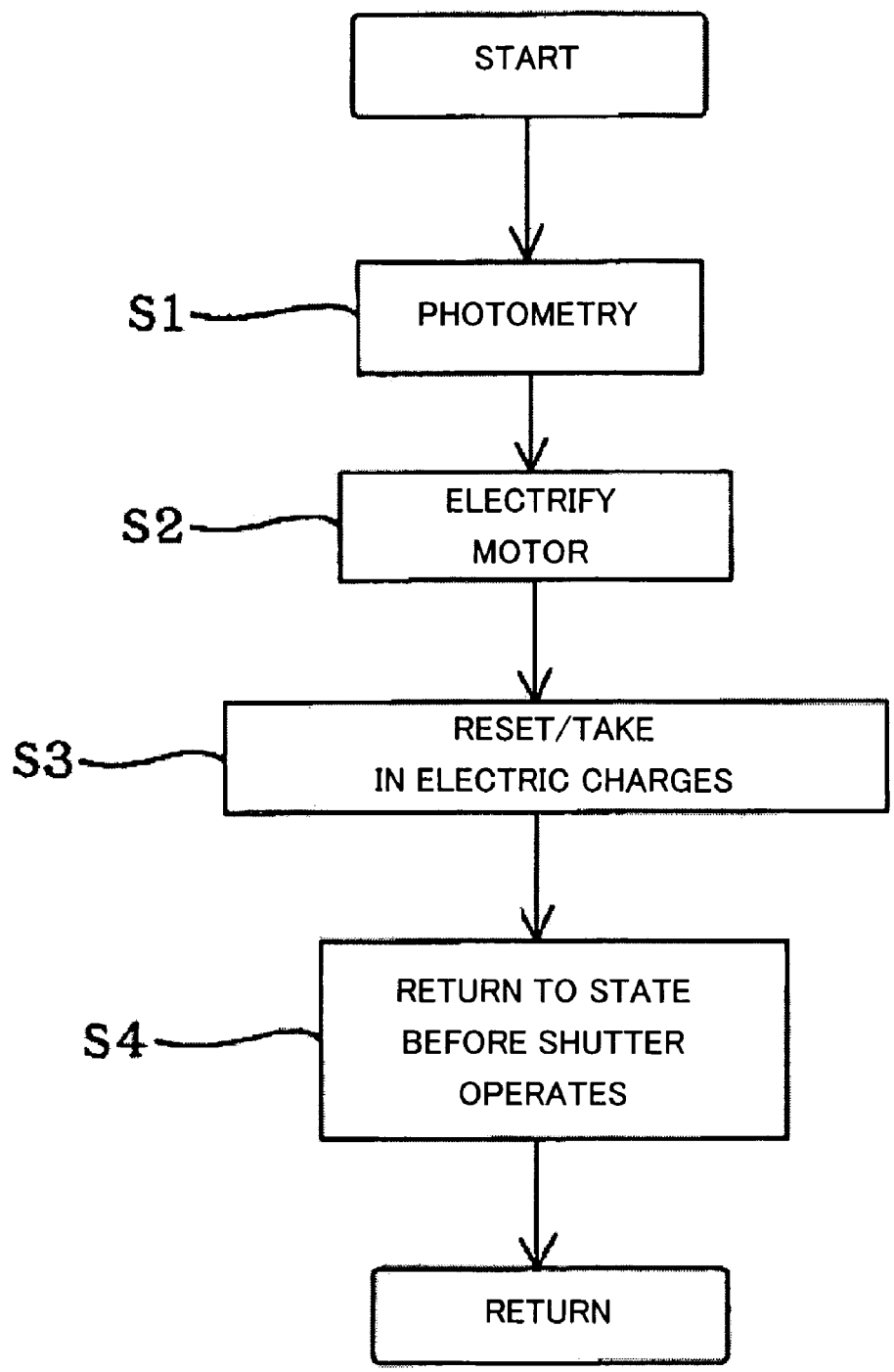
FIG. 16 is a flowchart showing a stop adjusting action and a shutter action in the light control apparatus according to the first embodiment.

In step ("S") 1 in FIG. 16, the controller 140 commands a photometry unit 150 in the camera body 100 to start a photometric action after the camera is powered on and a photographer presses a photographing ready switch. In step 2, the controller 140 electrifies the stepping motor 2 and the electromagnetic motor 6 so that the aperture having an aperture in accordance with the photometric result from the release state shown in FIG. 3. Thereby, a polygonal aperture in accordance with the photometric result is formed approximately around the optical axis.

The controller 140 shown in FIG. 1 sequentially supplies the stepping motor 2 with the necessary number of pulsed signals to form the aperture determined based on the photometric result by changing a current value. In accordance with the photometric result, the electromagnetic motor 6 is similarly supplied with the drive signal having a current value necessary to form the determined aperture. As the controller 140 controls the current values of the pulsed signal and the drive signal, the multistage (or substantially continuous) aperture can be set as shown in FIGS. 4 to 7.

The electromagnetic motor 6 has a rotational area of about 30°, and its rotational position is held at its both ends by the holding power as the magnetic force of the motor coil. The rotational position of the electromagnetic motor 6 is controlled by a balance between the magnetic field generated in the motor coil in accordance with a current value and the magnetic field of the bipolar magnetized moving magnet that rotates with the driving lever 7.

In the stop states shown in FIGS. 4 to 7, the blades 4 and 5 are held in place by maintaining the stepping motor 2 not electrified. The blades 8 and 9 are held in place when the electromagnetic motor 6 is supplied with a drive signal having a current value to obtain an intermediate stop state.

Figure 8:
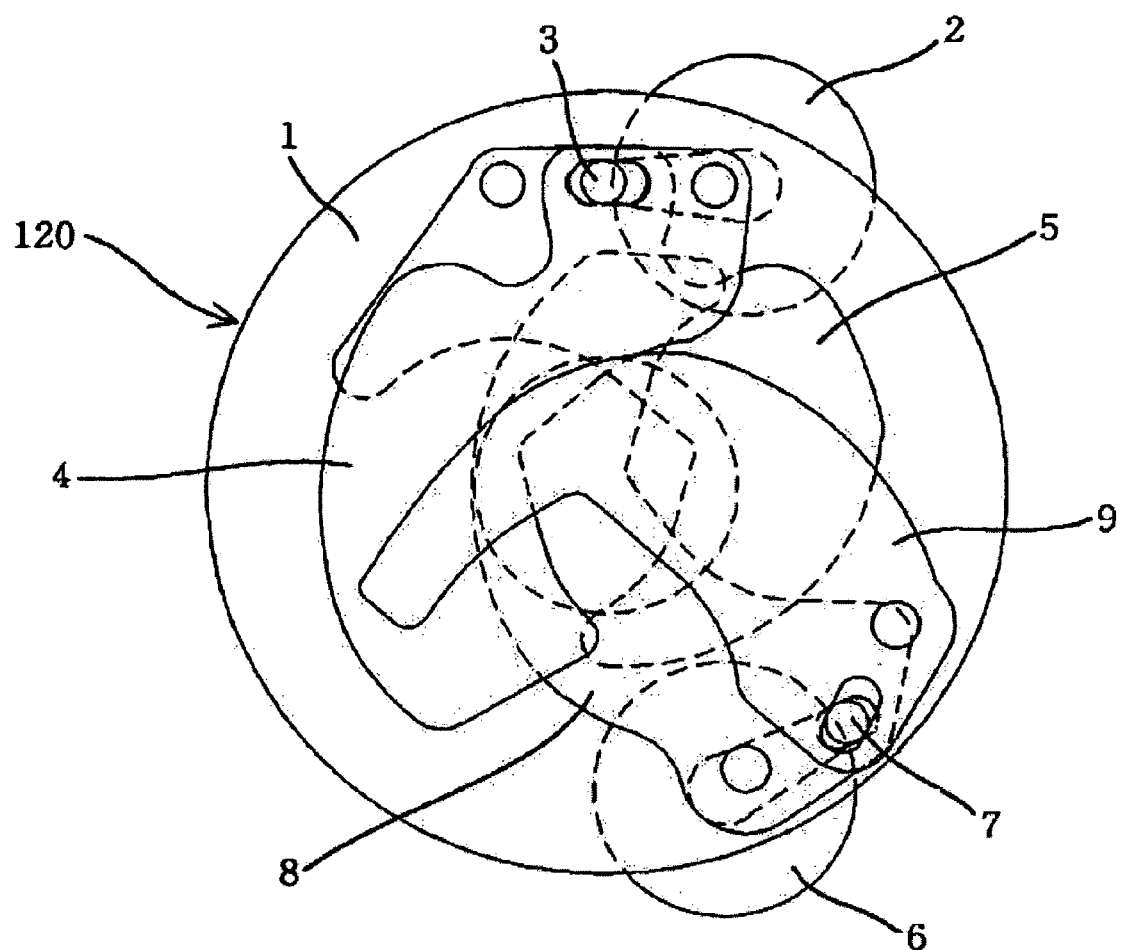
FIG. 8 is a front view of the light control apparatus that finishes the shutter action according to the first embodiment.

In step 3, when a photographer presses a shot switch (not shown), the controller 140 starts resetting the electric charges stored in the image-pickup device 130 and taking in the electric charges. At approximately the same time, a shutter close signal is supplied to the electric motor 6. The shutter close signal is supplied by further increasing the current value necessary for the drive signal to hold the electronic motor 6 at that stop state. Thereby, the electronic motor 6 further rotates in a C direction shown in FIG. 3 irrespective of a stop position the stepping motor 2 (blades 4 and 5), and the blades 8 and 9 rotate and close the opening. FIG. 8 shows that the shutter action ends.

In step 4, when taking in and transfers of the electric charges from the image-pickup device 130 end, the controller 140 resets the current value of the drive signal to be supplied again to the electromagnetic motor 6 to the value before the shutter action. Thereby, the procedure returns to the stop state before the shutter action.

The present invention is not limited to this embodiment that sets an electromagnetic driving source that drives the blades 4 and 5 to the stepping motor and an electromagnetic driving source that drives the blades 8 and 9 to the moving magnet type electromagnetic motor. As long as a driving source can rotate each blade to a predetermined position, the driving source may be one, such as a plunger, which controls the blades' rotational drive amounts by controlling the current value.

The aperture does not necessarily have to be close to a circle: The rotational driving amounts of the blades 8 and 9 are made different from those of the blades 4 and 5 so that the aperture has an elongated cat-eyed shape.

Second Embodiment

Figure 9:
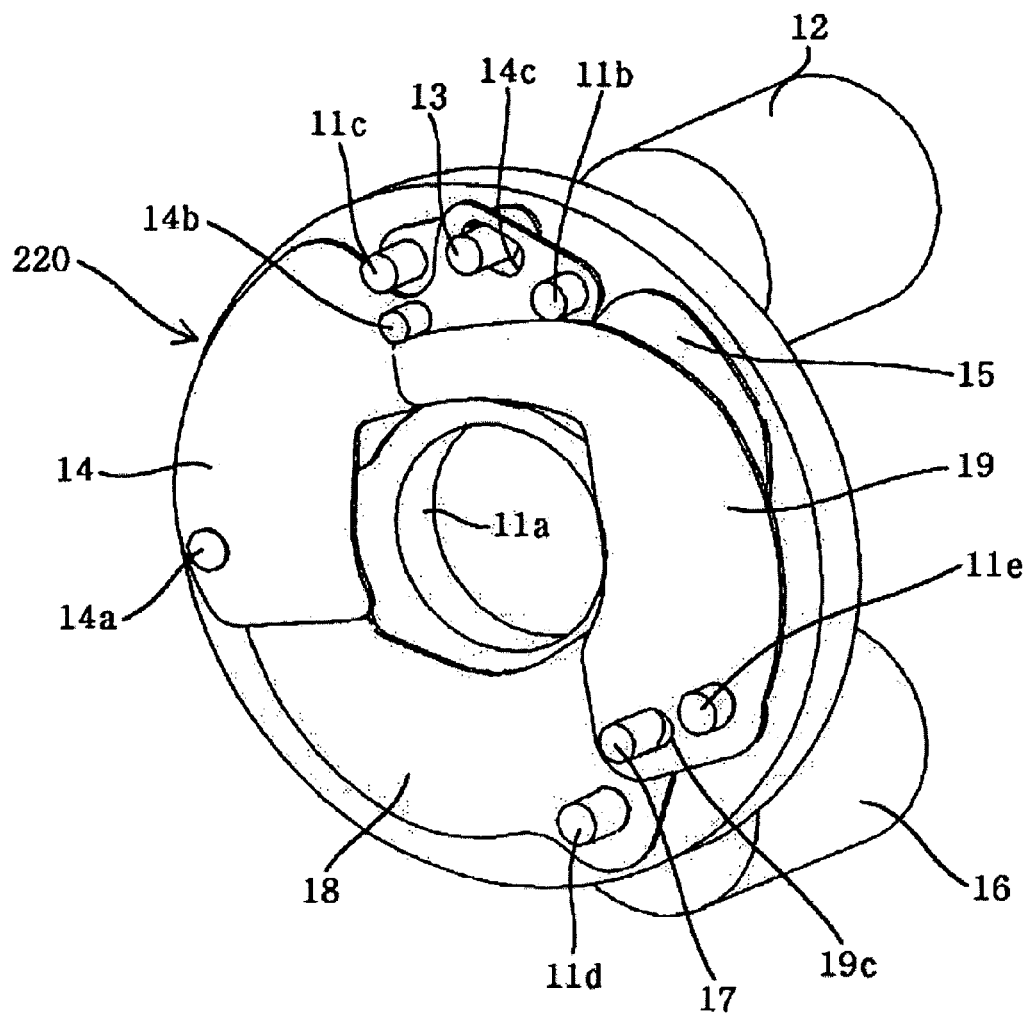
FIG. 9 shows a schematic structure of a digital still camera according to a second embodiment of the present invention.
Figure 10:
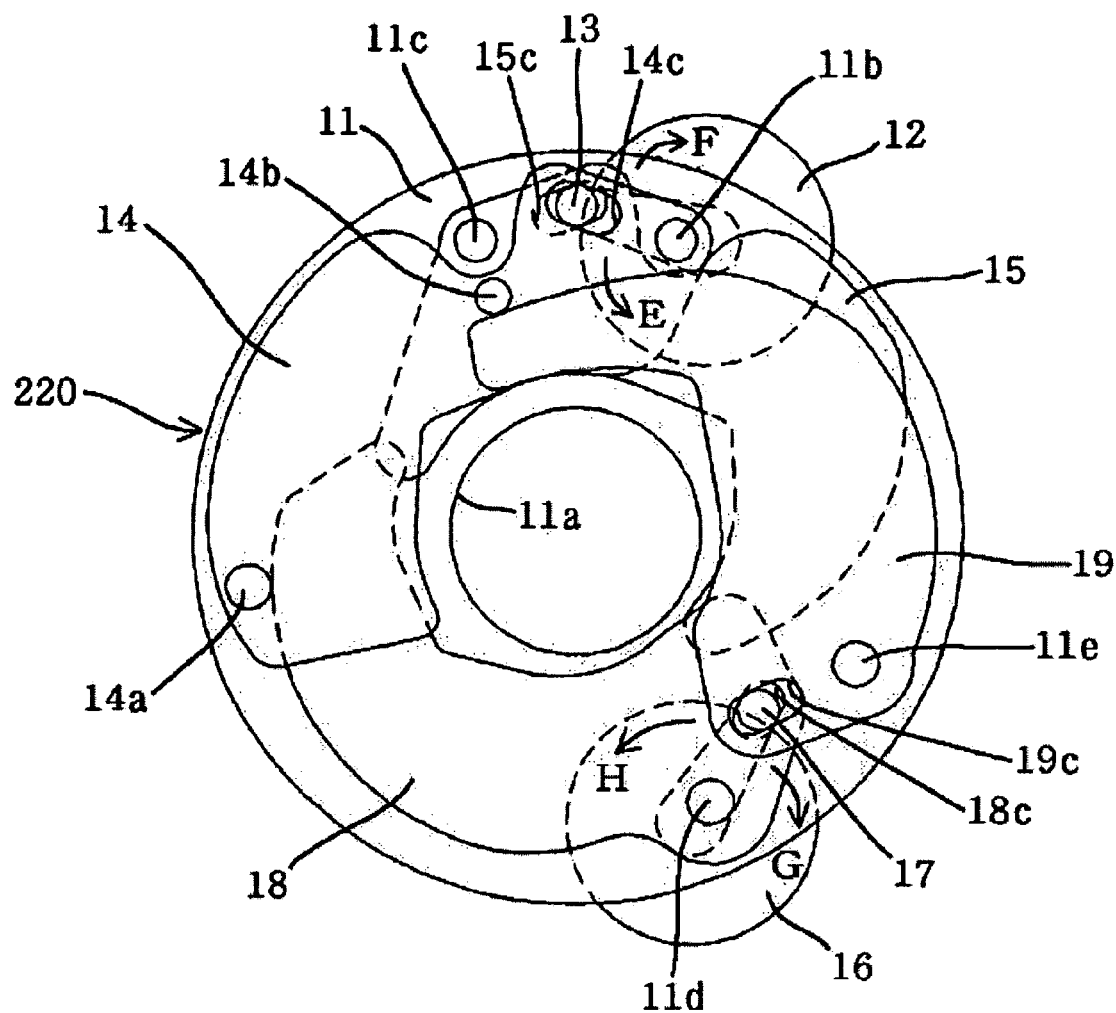
FIG. 10 is a front view of the light control apparatus in a release state according to the second embodiment.
Figure 11:
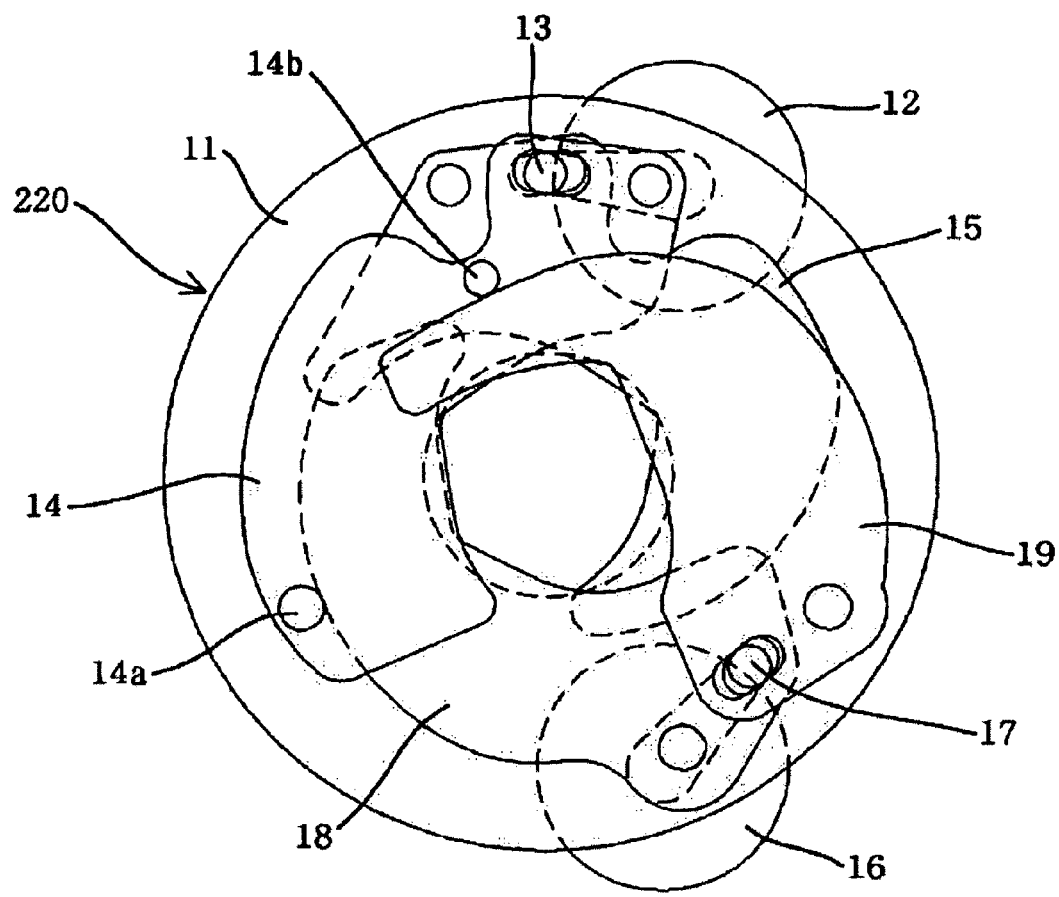
FIG. 11 is a front view of the light control apparatus in an intermediate stop state according to the second embodiment.

FIGS. 9 and 10 show a structure of the light control apparatus 220 as a stop-cum-shutter unit according to a second embodiment of the present invention. The light control apparatus 220 of this embodiment is provided in an image-taking optical system in the camera, as in the first embodiment.

11 denotes a base plate having a release opening 11a at its center thereof. A stepping motor (or first actuator) 12 is held above the base plate 11, and a rotation of the stepping motor 12 is transmitted to blades (or first light shielding members) 14 and 15 via a driving lever 13.

The blade 14 has two contact parts 14a and 14b. The contact part 14a has such a convex shape at the side of the base plate 11 that the contact part 14a contacts an outer circumference part of the blade 18. The contact part 14b has such a convex shape at a side opposing to the base plate 11 that the contact part 14b contacts an outer circumference part of the blade 19. This embodiment that provides one blade 14 with two contact parts 14a and 14b has higher positional precision of each of the contact parts 14a and 14b than a configuration that provides each of plural blades with a contact part As the stepping motor 12 rotates in an E direction in FIG. 10, the blades 14 and 15 rotate around shaft parts 11b and 11c provided on the base plate 11, and close an opening formed by the blades 14 and 15. When the contact parts 14a and 14b push the blades 18 and 19 as the blade 14 rotates, the blades 18 and 19 rotate around the shaft parts 11d and 11e. Thus, the blades 14, 15, 18 and 19 form an aperture.

At this time, since the rotor of the electromagnetic motor 16 is connected to the blades 18 and 19 via the driving lever 17, as described later, the rotor rotates as the contact parts 14a and 14b of the blade 14 move the blades 18 and 19 in the closing direction.

The blades 18 and 19 contact the contact parts 14a and 14b of the blade 14 outside the light control apparatus 220 in the radial direction. Therefore, when the blades 18 and 19 rotate in the opening direction and the blades 14 and 15 rotate in the closing direction, the contact parts 14a and 14b contact the blades 18 and 19. On the contrary, when only the blades 18 and 19 rotate in the closing direction, the blades 18 and 19 separate from the contact parts 14a and 14b.

When the stepping motor 12 rotates in an F direction in FIG. 10, the blades 14 and 15 rotate around the shaft parts 11b and 11c and open the opening formed by the blades 14 and 15.

A bipolar moving magnet type electromagnetic motor (second actuator) 16 is held under the base plate 11. A rotation of the electronic motor 16 is transmitted to the driving lever 17 to the blades (second light shielding members) 18 and 19.

The electromagnetic rotor 16 includes a rotor and a yoke, and has a weak holding (or cogging) power enough to open the blades 18 and 19 and enable them to contact the contact parts 14a and 14b of the blade 14. In other words, when the electronic motor 16 is not electrified, the blade 18 always contacts the contact part 14a of the blade 14 while the blade 19 always contacts the contact part 14b of the blade 14.

As the electromagnetic motor 16 rotates in a G direction in FIG. 10, the blades 18 and 19 rotate around the shaft parts 11d and 11e provided on the base plate 11, and close the opening formed by the blades 18 and 19. As the electromagnetic motor 16 rotates in an H direction in FIG. 10, the blades 18 and 19 rotate around the shaft parts 11d and 11e, and open the opening formed by the blades 18 and 19.

The electronic motor 16 has a holding power to open the blades 18 and 19, as discussed above, and the stepping motor 12 should drive the blades 14 and 15 with a larger driving power than the holding power in order to close the blades 14 and 15. However, the holding power of the electromagnetic motor 16 is as large as one to restrain the saccadic movements between the contact part 14a of the blade 14 and blade 18 and between the contact part 14b of the blade and the blade 19, and is not an excessively large load in driving the blades 14 and 15.

A description will be given of an arrangement among the blades 14, 15, 18 and 19. The blade 15 is arranged closest to the base plate 11, and the blades 18, 14 and 19 arranged on the blade 15 in this order. The tips of the blades 15 and 18 and peripheral parts of the shaft parts 11c and 11d as rotational centers always overlap each other. The above overlapping order of the four blades 14, 15, 18 and 19 maintains irrespective of their rotational states, and no interference occurs which would otherwise preclude the operations among the blades.

A cover plate (not shown) is attached to the base plate 11 and covers the blades 14, 15, 18 and 19 so as to rotatably house these blades 14, 15, 18 and 19 in a space along a predetermined optical-axis direction.

FIG. 10 shows that all of the blades 14, 15, 18 and 19 rotate to the fully open positions, and the aperture at this state is a release aperture corresponding to the release opening 11a. In this state, both the stepping motor 12 and the electromagnetic motor 16 are not electrified.

A description will be given of the stop adjusting action and shutter action of the thus configured light control apparatus 220.

Initially, the controller 140 commands the photometry unit 150 in the camera body 100 to start a photometric action after the camera is powered on and a photographer presses a photographing ready switch (not shown). The controller 140 electrifies the stepping motor 12 so that the aperture in accordance with the photometric result from the release state shown in FIG. 10. Thereby, a polygonal aperture in accordance with the photometric result is formed approximately around the optical axis.

The controller 140 shown in FIG. 1 sequentially supplies the stepping motor 12 with the necessary number of pulsed signals to form the aperture determined based on the photometric result by changing a current value. As the controller 140 controls the current values of the pulsed signal, the multistage (or substantially continuous) aperture can be set as shown in FIGS. 11 to 14.

Figure 12:
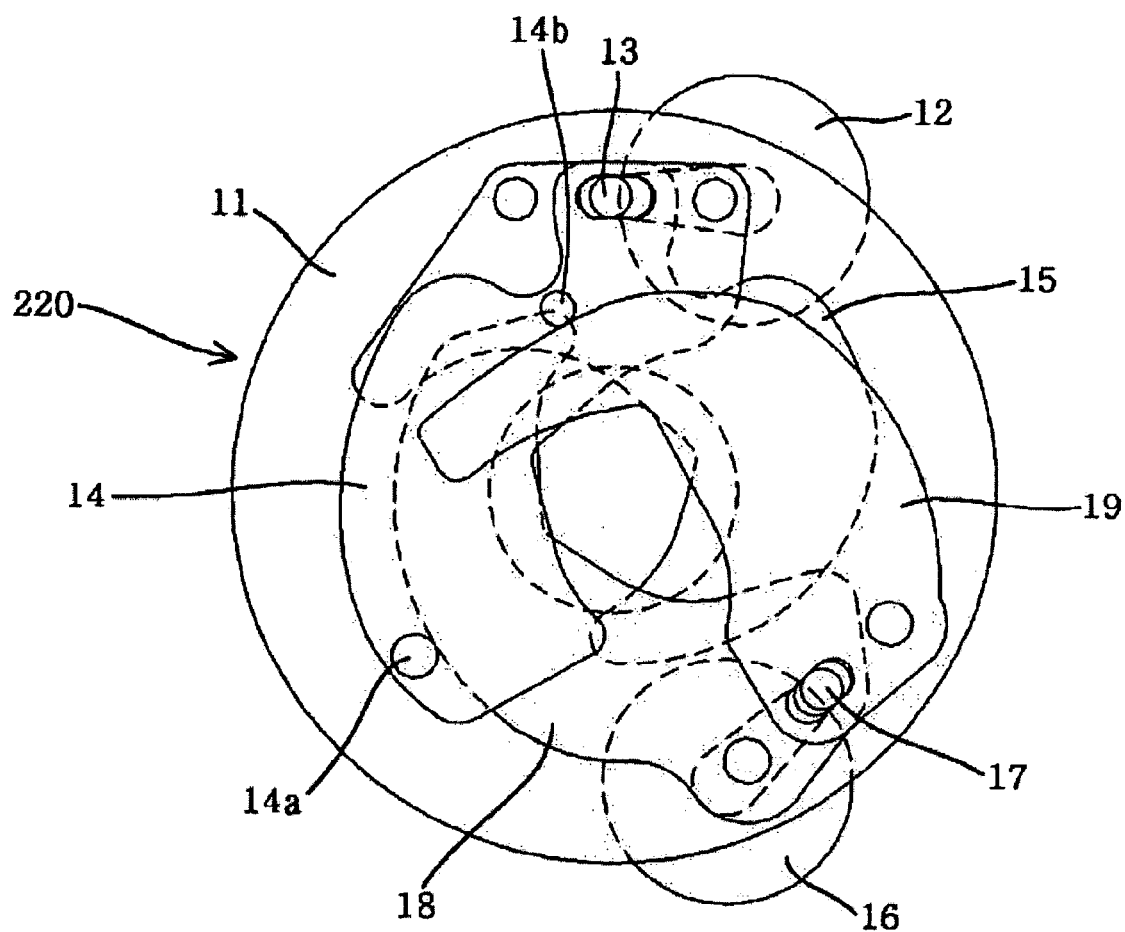
FIG. 12 is a front view of the light control apparatus in an intermediate stop state according to the second embodiment.
Figure 13:
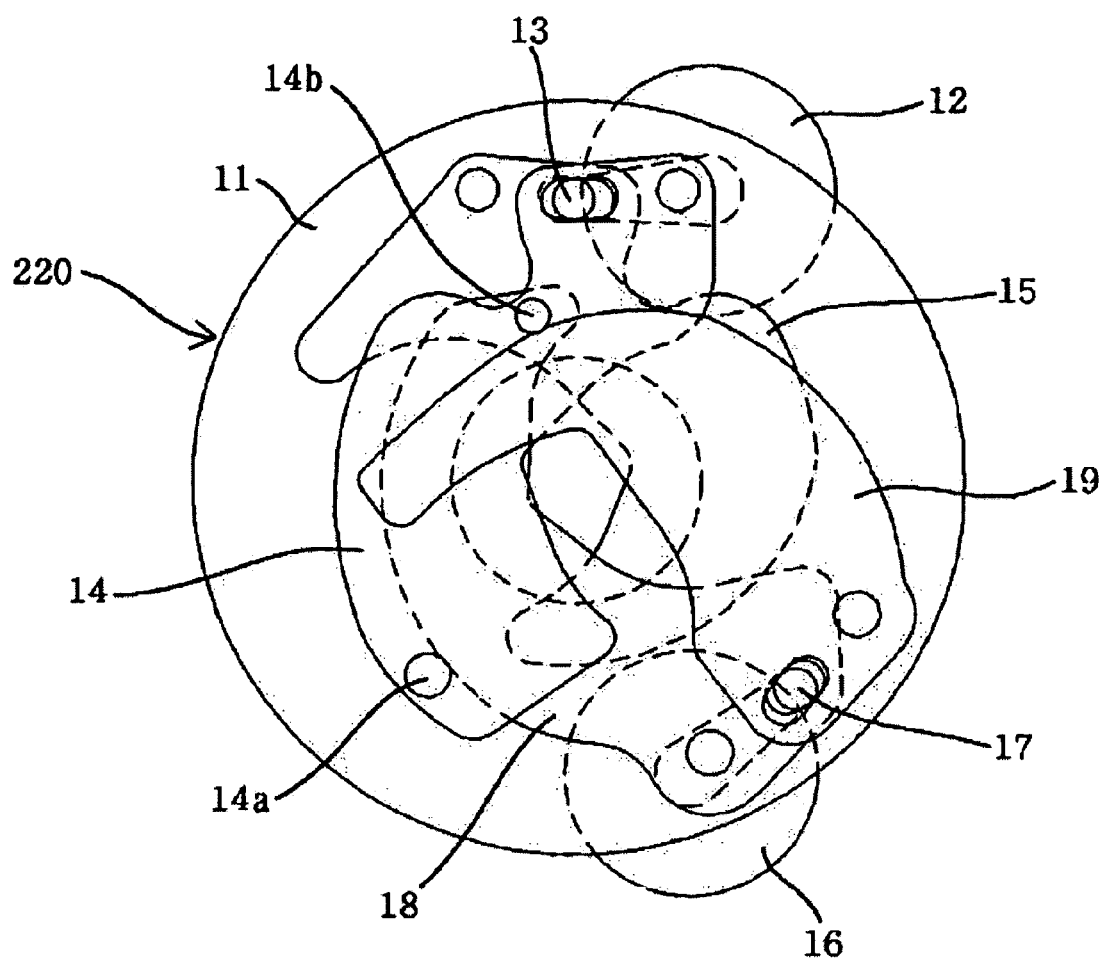
FIG. 13 is a front view of the light control apparatus in an intermediate stop state according to the second embodiment.
Figure 14:
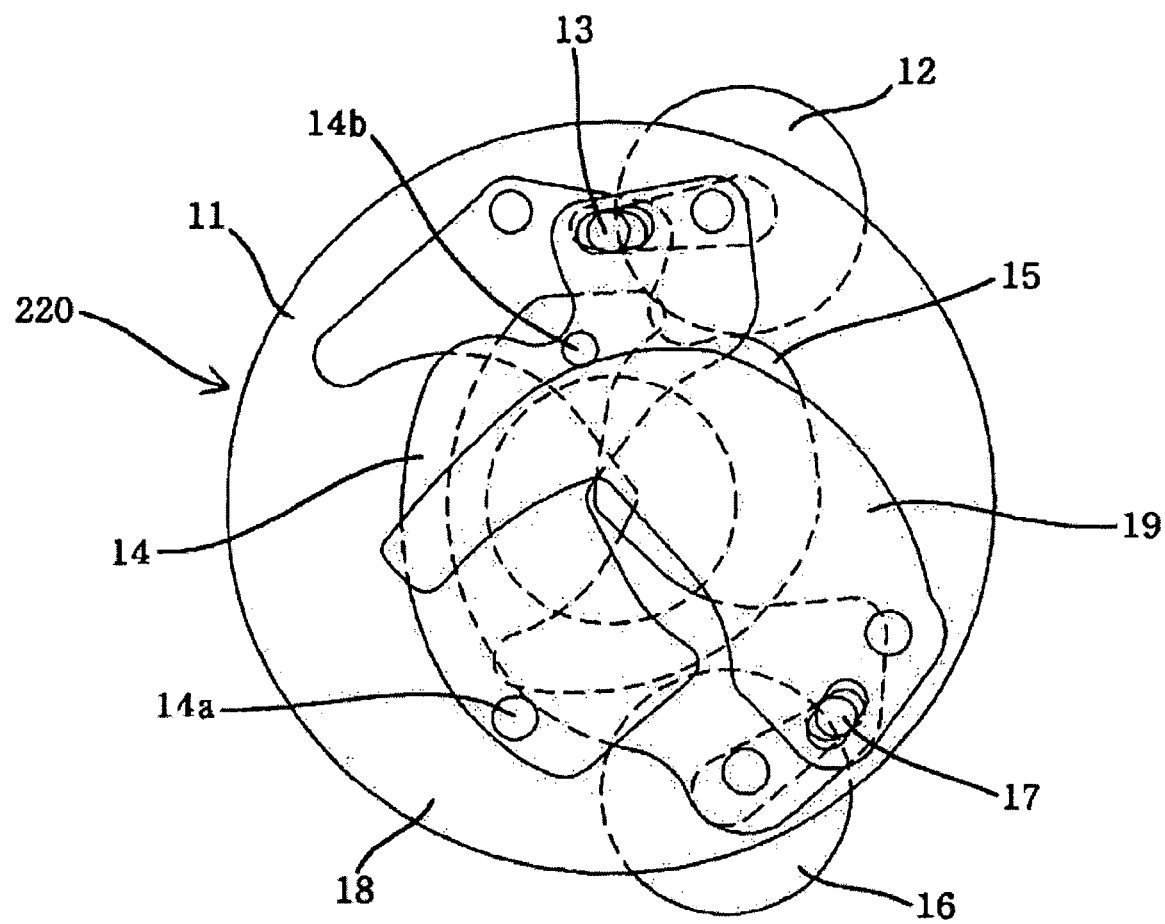
FIG. 14 is a front view of the light control apparatus in an intermediate stop state according to the second embodiment.

For example, when the stepping motor 12 operates the blades 14, 15, 18 and 19 through predetermined pulse driving, the state shown in FIG. 12 is obtained and maintained when the stepping motor 12 is powered off. Although the electronic motor 16 is not also electrified at this time, the holding power of the electronic motor 16 moves the blades 18 and 19 in the opening direction and allows them to contact the contact parts 14a and 14b of the blade 14.

The contact part 14b provided onto the blade 14 is not necessary for the stop adjusting action, and the contact part 14a may operate the blade 18 and the blade 19 via the driving lever 17.

Figure 15:
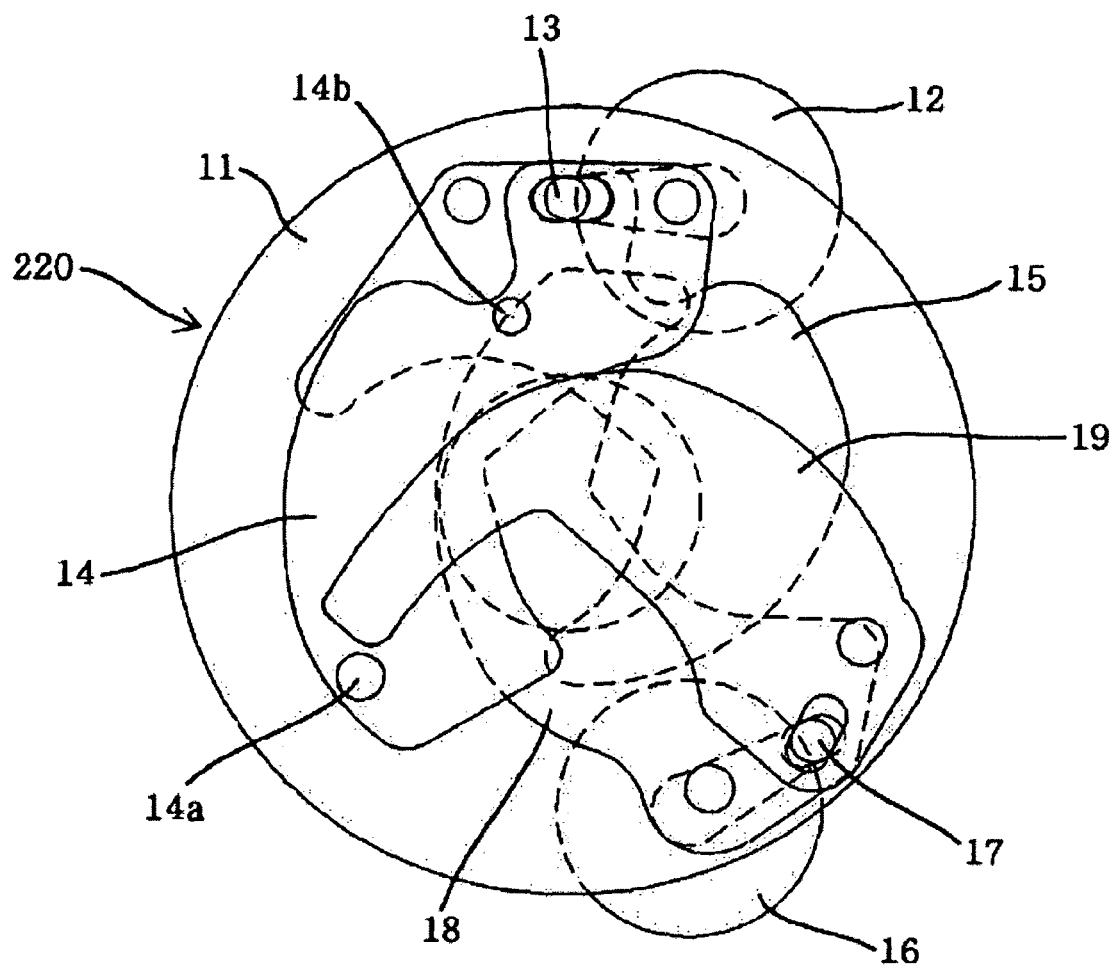
FIG. 15 is a front view of the light control apparatus that finishes the shutter action according to the second embodiment.

When the photographer presses a shot switch (not shown), the controller 140 starts resetting the electric charges stored in the image-pickup device 130 and taking in the electric charges. At approximately the same time, a shutter close signal is supplied to the electric motor 16. The shutter close signal is supplied by further increasing the current value necessary for the drive signal to hold the electronic motor 16 at that stop state. Thereby, the electronic motor 16 further rotates in a G direction shown in FIG. 10 irrespective of a stop position the stepping motor 12 (blades 14 and 15), and rotates so that the blades 18 and 19 close the opening. FIG. 15 shows that the shutter action ends.

When taking in and transfers of the electric charges from the image-pickup device 130 end, the controller 140 resets the current value of the drive signal to be supplied again to the electromagnetic motor 16 to the value before the shutter action. A single photographing sequence is completed by stopping the electrification to the electronic motor 16.

The light control apparatus of this embodiment adjusts the stop only by driving the stepping motor 12, and facilitates control over the aperture. In addition, the light control apparatus can execute the shutter action only by driving the electromagnetic motor 16.

In the shutter action, the blades 18 and 19 in the specific stop state rotate to close the opening, and no unnecessary operational areas for the blades 18 and 19 enable the high-speed shutter action. The blades 18 and 19 rotate to close the opening at the same time when the electromagnetic motor 16 is electrified, restraining the delays of mechanical actions and scattering of exposure time.

The present invention is not limited to this embodiment that sets an electromagnetic driving source that drives the blades 14 and 15 to the stepping motor and an electromagnetic driving source that drives the blades 18 and 19 to the moving magnet type electromagnetic motor. As long as a driving source can rotate each blade to a predetermined position, the driving source may be one, such as a plunger, which controls the blades' rotational drive amounts by controlling the current values.

A reduction gear mechanism may be provided between the stepping motor 12 and the driving lever 13 for precise control over the aperture. Thereby, a rotational force of the stepping motor 12 can be amplified, the number of stop stages increases, and the positional precision improves.

While this embodiment uses the holding power of the electromagnetic motor 16 to maintain the blades 18 and 19 in contact with the contact parts 14a and 14b of the blade 14, the present invention is not limited to this embodiment. For example, a spring is coupled to the driving lever 17 or the blades 18 and 19 so as to force the blades 18 and 19 in the opening direction. The plunger and the non-electrification holding power via the spring may be used to maintain the blades 18 and 19 in contact with the contact parts 14a and 14b, instead of the electromagnetic motor 16.

On the other hand, the contact parts 14a and 14b provided on the blade 14 may be formed as separate members or integrally formed by using plastic, etc.

While the above embodiments discuss an arrangement of the light control apparatus in the image-taking optical system in the integrated lens camera, the present invention is applicable to an arrangement of the light control apparatus of each embodiment in a lens unit in a camera system that includes the lens unit and the camera body mounted with the lens unit. In this case, a controller in the lens unit as well as a controller in the camera body can execute the driving control of the light control apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims foreign priority benefits based on Japanese Patent Application No. 2004-296908, filed on Oct. 8, 2004, which is hereby incorporated by reference herein in its entirety as if fully set forth herein.

What is claimed is:

1. A light control apparatus comprising:
   a first actuator;
   a second actuator;
   a first light shielding member driven by said first actuator; and
   a second light shielding member driven by said second actuator, the second light shielding member being also driven by contact with the first light shielding member driven by the first actuator,
   wherein in a stop adjusting action, said first actuator drives said first light shielding member and said first light shielding member drives said second light shielding member to adjust a diameter of an aperture formed by said first and second light shielding members, and
   wherein in a shutter action, said second actuator drives said second light shielding member from a state where said second light shielding member forms the aperture.

2. A light control apparatus according to claim 1, wherein in the shutter action, said first light shielding member is held at a stop adjusting position that is a position when the shutter action starts.

3. A light control apparatus according to claim 1, wherein the apparatus includes a plurality of said second light shielding members.

4. A light control apparatus according to claim 3, wherein said second light shielding member includes a plurality of protruding contact parts for driving said plurality of said second light shielding members.

5. A light control apparatus according to claim 1, wherein said first and second actuators are of different types.

6. A light control apparatus according to claim 5, wherein said first actuator changes its stop position in accordance with an applied current value, and said second actuator produces a power to move said second light shielding member in a direction of bringing said second light shielding member into contact with said first light shielding member when said second actuator is not electrified.

7. A light control apparatus according to claim 1, wherein in the shutter action, said second actuator drives said second light shielding member irrespective of a stop position of said first light shielding member.

8. An optical apparatus comprising an optical system including an light control apparatus according to claim 1.

9. An optical apparatus according to claim 8 further comprising an image-pickup device photoelectrically converting an object image formed by said optical system.

10. An optical apparatus according to claim 8 further comprising a controller that controls the stop adjusting action of said light control apparatus in accordance with photometry information and starts the shutter action of said light control apparatus from a state where the stop adjusting action has been performed in accordance with the photometry information.

* * * * *